United States Patent [19]

Callan

[11] 4,112,020
[45] Sep. 5, 1978

[54] HOT MELT BUTYL SEALANT INTERMEDIATE

[75] Inventor: John E. Callan, Broken Arrow, Okla.

[73] Assignee: Cities Service Company, Tulsa, Okla.

[21] Appl. No.: 823,241

[22] Filed: Aug. 10, 1977

Related U.S. Application Data

[63] Continuation-in-part of Ser. No. 689,023, May 24, 1976, abandoned.

[51] Int. Cl.$^2$ .............................................. C08L 67/06
[52] U.S. Cl. .................................... 260/873; 260/874; 260/860; 260/887; 260/892; 260/894; 260/896
[58] Field of Search ............... 260/873, 887, 896, 892, 260/874, 894, 860

[56] References Cited

U.S. PATENT DOCUMENTS

| | | | |
|---|---|---|---|
| 3,651,014 | 3/1972 | Witsiepe | 260/873 |
| 3,674,735 | 7/1972 | Callan | 260/42.36 |
| 3,853,796 | 12/1974 | Oldack et al. | 260/857 D |
| 3,900,999 | 8/1975 | Callan | 52/744 |
| 3,959,062 | 5/1976 | Hoh et al. | 260/873 |
| 3,965,055 | 6/1976 | Schichman et al. | 260/857 D |
| 3,987,122 | 10/1976 | Bartz et al. | 260/28.5 AV |

Primary Examiner—M. J. Welsh
Attorney, Agent, or Firm—Patricia J. Hogan

[57] ABSTRACT

Intermediate compositions useful for the preparation of improved hot melt butyl sealants are obtained by partially grafting a mixture of a butyl rubber, a different elastomer and/or a crystalline polymeric resin, and an elastomeric resin. Preferred compositions are (1) partially grafted mixtures of butyl rubber, epichlorohydrin rubber, and a block copolyester elastomeric resin, (2) partially grafted mixtures of butyl rubber, ethylene-vinyl acetate copolymer, and a block copolyester elastomeric resin, and (3) partially grafted mixtures of butyl rubber, styrene-ethylene-butylene-styrene block copolymer rubber, and a block copolyester elastomeric resin.

12 Claims, No Drawings

HOT MELT BUTYL SEALANT INTERMEDIATE

CROSS-REFERENCE TO RELATED APPLICATION

This application is a continuation-in-part of copending application Ser. No. 689,023, filed May 24, 1976 and now abandoned.

BACKGROUND OF THE INVENTION

1. Field of the Invention

This invention relates to sealant compositions and more particularly relates to intermediates for the preparation of improved hot melt butyl sealants.

2. Description of the Prior Art

It is known that sealants are useful in various applicance, automotive, and construction markets for sealing joints, such as masonry-metal, glass-metal, and glass-glass joints. Sealants such as asphalt, mastics, and putty have some utility in this regard, but they have the disadvantages of containing solvents, exhibiting creep and sag at various temperatures, shrinking with age, and having unacceptable moisture vapor transmission rates. Hot melt butyl sealants have been found preferable to other prior art sealants in many ways. However, even these hot melt butyl sealants, which are prepared by mixing the ingredients together in a low-shear open mixer (i.e., by "dry mixing"), have properties which could bear improvement.

SUMMARY OF THE INVENTION

An object of this invention is to provide improved hot melt butyl sealant compositions.

Another object is to provide such compositions via novel intermediate compositions.

These and other objects are attained by mixing and heating (A) a butyl rubber having a Mooney viscosity (ML 1+3 at 260° F.) of about 30–80, (B) about 25–150 phr of (1) a different elastomer selected from the group consisting of diene rubbers, polyisobutylene, styrene-olefin copolymer rubbers, epichlorohydrin rubber, ethylene-propylene-polyene terpolymers, and mixtures thereof and/or (2) a crystalline polymeric resin, and (C) about 25–150 phr of an elastomeric resin in an internal high-shear mixer at 300–400° F. to effect partial grafting of the ingredients.

The intermediate composition thus obtained may then be compounded with other conventional sealant ingredients, such as fillers, extenders, and tackifying resins, in a low-shear external mixer to form a hot melt sealant.

DESCRIPTION OF THE PREFERRED EMBODIMENTS

The butyl rubber of the invention can be any butyl rubber having a Mooney viscosity (ML 1+3 at 260° F.) of about 30–80. Thus, it is a copolymer of isobutylene with a minor amount, e.g., about 1–5 mol percent, of a conjugated polyene, such as butadiene, isoprene, piperylene, 2,3-dimethylbutadiene, cyclooctadiene, cyclododecatriene, etc.; and it may be slightly crosslinked. It is preferably one of the slightly crosslinked butyl rubbers of U.S. Pat. No. 3,674,735. The most preferred butyl rubbers are those which have a Mooney viscosity (ML 1+3 at 260° F.) of about 50–60.

The additional elastomer that may be employed in the practice of the invention can be any thermosensitive polymer having an approximately straight-line relationship in a viscosity-temperature diagram and selected from the group consisting of diene rubbers, polyisobutylene, styrene-olefin copolymer rubbers, epichlorohydrin rubber, ethylene-propylene-polyene terpolymers, and mixtures thereof. Such elastomers, of course, are well known. Suitable diene rubbers (i.e., rubbery polymers containing at least 50% by weight of combined conjugated diene) include, e.g., natural rubber, polybutadiene, butadiene-styrene copolymers, isoprene-styrene copolymers, polychloroprene, etc.; suitable styrene-olefin copolymers include, e.g., styrene-ethylene-butylene-styrene block copolymers having styrene contents of about 25–35% by weight, etc.; suitable ethylene-propylene-polyene terpolymers include, e.g., terpolymers of ethylene and propylene with up to about 5%, usually about 3–5%, by weight of a combined polyene, such as cyclooctadiene, dicyclopentadiene, 1,4-hexadiene, ethylidenenorbornene, methylenenorbornene, 1,4,9-decatriene, etc. Particularly preferred are the epichlorohydrin rubbers and the styrene-ethylene-butylene-styrene block copolymers.

The crystalline polymeric resin that is used instead of or in addition to the optional elastomer may be any of the crystalline or crystallizable polymeric resins conventionally employed in sealant compositions and capable of providing a crystalline resin in the processed compositions. Exemplary of such polymeric resins are polyethers, such as poly(alkylene oxides); polyesters, such as block polyester-polyether copolymers; polyamides, such as reaction products of dimer acids and linear diamines; polyolefins, such as polypropylene; ethylene-ethyl acrylate copolymers; ethylene-vinyl acetate copolymers, etc., and mixtures thereof. Particularly preferred are ethylene-vinyl acetate copolymers having combined vinyl acetate contents of about 5–35% by weight and ethylene-ethyl acrylate copolymers having combined ethyl acrylate contents of about 15–25% by weight.

The amount of optional elastomer and/or crystalline polymeric resin employed in the practice of the invention is in the range of about 25–150 phr, i.e., about 25–150 parts per 100 parts of the butyl rubber.

The elastomeric resin of the invention, which is also employed at a concentration of about 25–150 phr, is a thermoplastic polymer having a noticeable deflection in its viscosity-temperature diagram and may be any such resin that is conventionally employed in sealant compositions. However, it is preferably a block copolyester or a polyamide resin. Most preferably, it is a thermoplastic segmented copolyester elastomer having a melt index of less than 30 and consisting essentially of about 15–30% by weight of ester units derived from butanediol and a phthalic acid and about 85–70% by weight of units derived from polytetramethylene ether glycol 1500–3500 (i.e., a polytetramethylene ether glycol having an average molecular weight of about 1500–3500) and a phthalic acid, about 55–95% by weight of the phthalate units of the copolyester being terephthalate units.

In the practice of the invention, the butyl rubber, the different elastomer and/or crystalline polymeric resin, and the elastomeric resin are mixed and heated together in an internal high-shear mixer, e.g., a Banbury mixer, to effect partial grafting of the ingredients. This process is usually conducted at about 300–400° F., preferably about 330–360° F., for about 3–10 minutes to accomplish the formation of a composition containing at least about 1%, usually about 1–50%, and preferably about 1-10%, by weight of graft copolymers of the butyl rubber on the other components. When desired, the ingredients are subjected to the process in combination with about 25-50 phr of diatomaceous earth to facilitate removal of the partially grafted mixture from the mixer.

The intermediate composition thus obtained may then be compounded with conventional sealant additives, e.g., fillers, extenders, tackifying resins, additional elastomeric resins, etc., in any suitable manner, e.g., in an external low-shear mixer (such as a sigma blade mixer), to form a hot melt sealant composition. An advantage of the invention is that hot melt sealants prepared from the intermediate compositions of the invention have adhesive properties superior to those of hot melt sealants prepared by the conventional dry mix method.

The following examples are given to illustrate the invention and are not intended as a limitation thereof. Unless otherwise specified, quantities mentioned are quantities by weight.

EXAMPLE I

Prepare an intermediate composition from the following recipe:

| Ingredient | Parts |
| --- | --- |
| Butyl rubber having a Mooney viscosity (ML 1 + 3 at 260° F.) of 50-60 and a mol percent unsaturation of 1.5-2.0 | 100 |
| Styrene-ethylene-butylene-styrene block copolymer having a styrene content of about 30% and a Brookfield viscosity (20% in toluene) of 550 cps at 77° F. | 50 |
| Thermoplastic segmented copolyester elastomer having a melt index of less than 30 and consisting essentially of about 15-30% by weight of ester units derived from butanediol and a phthalic acid and about 85-70% by weight of units derived from polytetramethylene ether glycol 1500-3500 and a phthalic acid, about 55-95% by weight of the phthalate units of the copolyester being terephthalate units | 50 |
| Diatomaceous earth | 30 |

Mix the ingredients in a Banbury for 5 minutes and dump at 330° F. to recover an intermediate composition, about 1-10% of which consists of graft copolymers of the butyl rubber on the block copolymers. Then blend this intermediate composition with the following ingredients at 300° F. for 60 minutes in a sigma blade mixer:

| Ingredient | Parts |
| --- | --- |
| Polyamide resin | 100 |
| Terpene phenolic resin | 50 |
| $TiO_2$ | 5 |

The hot melt sealant thus prepared has the following properties:

| Lap Shear to Steel at 75° F. | 138 psi* |
| --- | --- |
| Lap Shear to Steel at 150° F. | 30 psi* |
| Peel Strength to Aluminum at 75° F. | 57 lbs./in.* |
| Peel Strength to Glass at 75° F. | 40 lbs./in.* |

*Cohesive failure

EXAMPLE II — CONTROL

Prepare a hot melt sealant composition by mixing the Example I ingredients entirely in a sigma blade mixer instead of first grafting some of the ingredients in a Banbury. The sealant has the following properties:

| Lap Shear to Steel at 75° F. | 117 psi** |
| --- | --- |
| Lap Shear to Steel at 150° F. | 20 psi* |
| Peel Strength to Aluminum at 75° F. | 54 lbs./in.* |
| Peel Strength to Glass at 75° F. | 30 lbs./in.* |

*Cohesive failure
**Adhesive failure

EXAMPLE III

Repeat Example I except for preparing the partially grafted intermediate from the following recipe:

| Ingredient | Parts |
| --- | --- |
| Butyl rubber of Example I | 100 |
| Ethylene-vinyl acetate copolymer having a vinyl acetate content of 28% and a melt index of 5 | 50 |
| Copolyester elastomer of Example I | 25 |

As in Example I, the sealant has properties superior to the properties of a comparable sealant prepared by the dry mix method.

EXAMPLE IV

Repeat Example I except for preparing the partially grafted intermediate from the following recipe:

| Ingredient | Parts |
| --- | --- |
| Butyl rubber of Example I | 100 |
| Epichlorohydrin rubber | 100 |
| Copolyester elastomer of Example I | 100 |
| Diatomaceous earth | 30 |

As in Example I, the sealant has properties superior to the properties of a comparable sealant prepared by the dry mix method.

Similar results are observed when the examples are repeated except that ingredients are replaced by ingredients taught to be their equivalents in the specification.

It is obvious that many variations may be made in the products and processes set forth above without departing from the spirit and scope of this invention.

What is claimed is:

1. A hot melt sealant intermediate composition comprising a partially grafted mixture of (A) a butyl rubber having a Mooney viscosity (ML 1+3 at 260° F.) of about 30-80, (B) about 25-150 phr of (1) a different elastomer selected from the group consisting of diene rubbers, polyisobutylene, styrene-olefin copolymer rubbers, epichlorohydrin rubber, ethylene-propylene-polyene terpolymers, and mixtures thereof and/or (2) a crystalline polymeric resin, and (C) about 25-150 phr of an elastomeric resin, at least about 1% by weight of the mixture consisting of graft copolymers of the butyl rubber on the other components.

2. The composition of claim 1 wherein the graft copolymers constitute about 1-50% by weight of the partially grafted mixture.

3. The composition of claim 3 wherein the graft copolymers constitute about 1-10% by weight of the partially grafted mixture.

4. The composition of claim 1 wherein the butyl rubber is a rubber having a Mooney viscosity (ML 1+3 at 260° F.) of about 50-60.

5. The composition of claim 1 wherein the different elastomer is a styrene-ethylene-butylene-styrene block copolymer rubber.

6. The composition of claim 1 wherein the different elastomer is an epichlorohydrin rubber.

7. The composition of claim 1 wherein the crystalline polymeric resin is an ethylene-vinyl acetate copolymer.

8. The composition of claim 1 wherein the elastomeric resin is a thermoplastic segmented copolyester elastomer consisting essentially of about 15–30% by weight of ester units derived from butanediol and a phthalic acid and about 85–70% by weight of units derived from polytetramethylene ether glycol 1500–3500 and a phthalic acid, about 55–95% by weight of the phthalate units of the copolyester being terephthalate units.

9. The composition of claim 1 wherein the partially grafted mixture comprises (A) a butyl rubber having a Mooney viscosity (ML 1+3 at 260° F.) of about 50–60, (B) about 100 phr of an epichlorohydrin rubber, and (C) about 100 phr of a thermoplastic segmented copolyester elastomer consisting essentially of about 15–30% by weight of ester units derived from butanediol and a phthalic acid and about 85–70% by weight of units derived from polytetramethylene ether glycol 1500–3500 and a phthalic acid, about 55–95% by weight of the phthalate units of the copolyester being terephthalate units.

10. The composition of claim 1 wherein the partially grafted mixture comprises (A) a butyl rubber having a Mooney viscosity (ML 1+3 at 260° F.) of about 50–60, (B) about 50 phr of an ethylene-vinyl acetate copolymer, and (C) about 25 phr of a thermoplastic segmented copolyester elastomer consisting essentially of about 15–30% by weight of ester units derived from butanediol and a phthalic acid and about 85–70% by weight of units derived from polytetramethylene ether glycol 1500–3500 and a phthalic acid, about 55–95% by weight of the phthalate units of the copolyester being terephthalate units.

11. The composition of claim 1 wherein the partially grafted mixture comprises (A) a butyl rubber having a Mooney viscosity (ML 1+3 at 260° F.) of about 50–60, (B) about 50 phr of a styrene-ethylene-butylene-styrene block copolymer rubber, and (C) about 50 phr of a thermoplastic segmented copolyester elastomer consisting essentially of about 15–30% by weight of ester units derived from butanediol and a phthalic acid and about 85–70% by weight of units derived from polytetramethylene ether glycol 1500–3500 and a phthalic acid, about 55–95% by weight of the phthalate units of the copolyester being terephthalate units.

12. A process for preparing the composition of claim 1 which comprises mixing and heating (A) a butyl rubber having a Mooney viscosity (ML 1+3 at 260° F.) of about 30–80, (B) about 25–150 phr of (1) a different elastomer selected from the group consisting of diene rubbers, polyisobutylene, styrene-olefin copolymer rubbers, epichlorohydrin rubber, ethylene-propylene-polyene terpolymers, and mixtures thereof and/or (2) a crystalline polymeric resin, and (C) about 25–150 phr of an elastomeric resin in an internal high-shear mixer at 300–400° F. to effect partial grafting of the ingredients.

* * * * *